United States Patent
Götz et al.

(10) Patent No.: US 10,718,384 B2
(45) Date of Patent: Jul. 21, 2020

(54) OLDHAM COUPLING

(71) Applicant: Schaeffler Technologies AG & Co. KG, Herzogenaurach (DE)

(72) Inventors: Manfred Götz, Memmelsdorf (DE);
Richard Baier, Aurachtal (DE);
Thomas Überall, Breitengüßbach (DE)

(73) Assignee: SCHAEFFLER TECHNOLOGES AG & CO. KG, Herzogenaurach (DE)

( * ) Notice: Subject to any disclaimer, the term of this patent is extended or adjusted under 35 U.S.C. 154(b) by 258 days.

(21) Appl. No.: 15/565,174

(22) PCT Filed: Mar. 24, 2016

(86) PCT No.: PCT/DE2016/200161
§ 371 (c)(1),
(2) Date: Oct. 9, 2017

(87) PCT Pub. No.: WO2016/162027
PCT Pub. Date: Oct. 13, 2016

(65) Prior Publication Data
US 2018/0112717 A1 Apr. 26, 2018

(30) Foreign Application Priority Data
Apr. 10, 2015 (DE) .......... 10 2015 206 411

(51) Int. Cl.
*F16D 3/04* (2006.01)
*F01C 17/06* (2006.01)

(52) U.S. Cl.
CPC .............. *F16D 3/04* (2013.01); *F01C 17/066* (2013.01)

(58) Field of Classification Search
CPC .............. F16D 3/04; F16D 3/72; F01C 17/066
USPC ............ 464/102, 104, 105; 123/90.17, 90.18
See application file for complete search history.

(56) References Cited

U.S. PATENT DOCUMENTS

| | | | | |
|---|---|---|---|---|
| 2,220,799 A | * | 11/1940 | Edwards | .................. F16D 3/04 464/105 |
| 3,072,417 A | * | 1/1963 | Ziegler | .................. B23B 31/08 |
| 4,994,005 A | | 2/1991 | Rennerfelt | |

(Continued)

FOREIGN PATENT DOCUMENTS

| CN | 1081239 A | 1/1994 |
|---|---|---|
| CN | 202132426 U | 2/2012 |
| CN | 202294080 U | 7/2012 |

(Continued)

*Primary Examiner* — Greg Binda
(74) *Attorney, Agent, or Firm* — Matthew V. Evans

(57) ABSTRACT

Oldham couplings are disclosed, for example, for use in electric camshaft adjusters. The Oldham coupling may include a first outer connecting disk and a second outer connecting disk having axes of rotation extending parallel to each other and a central connecting disk including one or more through-bores. One or more connecting elements may couple the first outer connecting disk to the central connecting disk via the through-bore(s). A sleeve may be arranged in the through-bore(s) such that the connecting element(s) contacts the sleeve and wear of the central connecting disk is reduced. For example, the sleeve may prevent direct contact of the connecting element(s) with the central connecting disk, such as by a spacer or flange. The sleeve may be made of metal, while the central connecting disk may be plastic or metal.

20 Claims, 4 Drawing Sheets

(56) References Cited

U.S. PATENT DOCUMENTS 7,506,623 B2 * 3/2009 Schafer .................. F01L 1/352
    123/90.17
8,360,654 B2 * 1/2013 Baier .................. B60B 27/0005

FOREIGN PATENT DOCUMENTS

| DE | 3312825 A1 | 10/1984 | | |
|---|---|---|---|---|
| DE | 102007049072 A1 | 4/2009 | | |
| DE | 102014218234 A1 | 3/2016 | | |
| GB | 23296 | * | 11/1908 | ................... 464/105 |
| GB | 1118455 A | 7/1968 | | |
| JP | H0599242 A | 4/1993 | | |
| JP | 2005249002 A | 9/2005 | | |

* cited by examiner

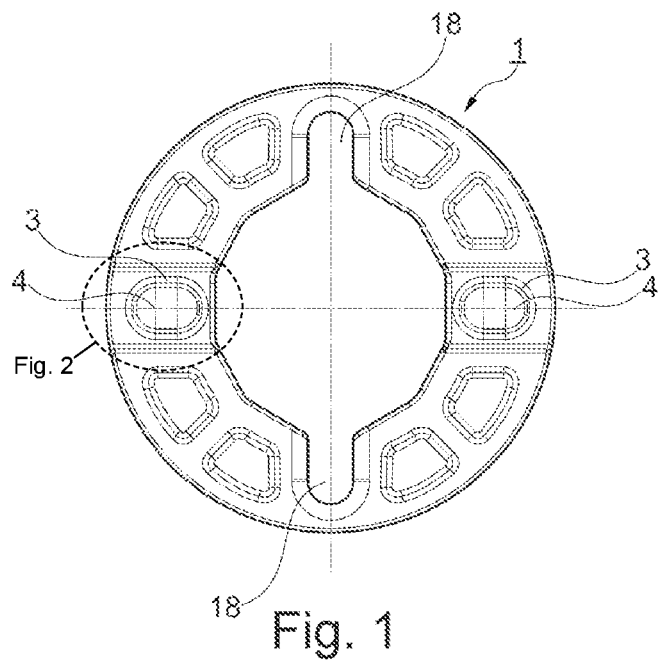
Fig. 1
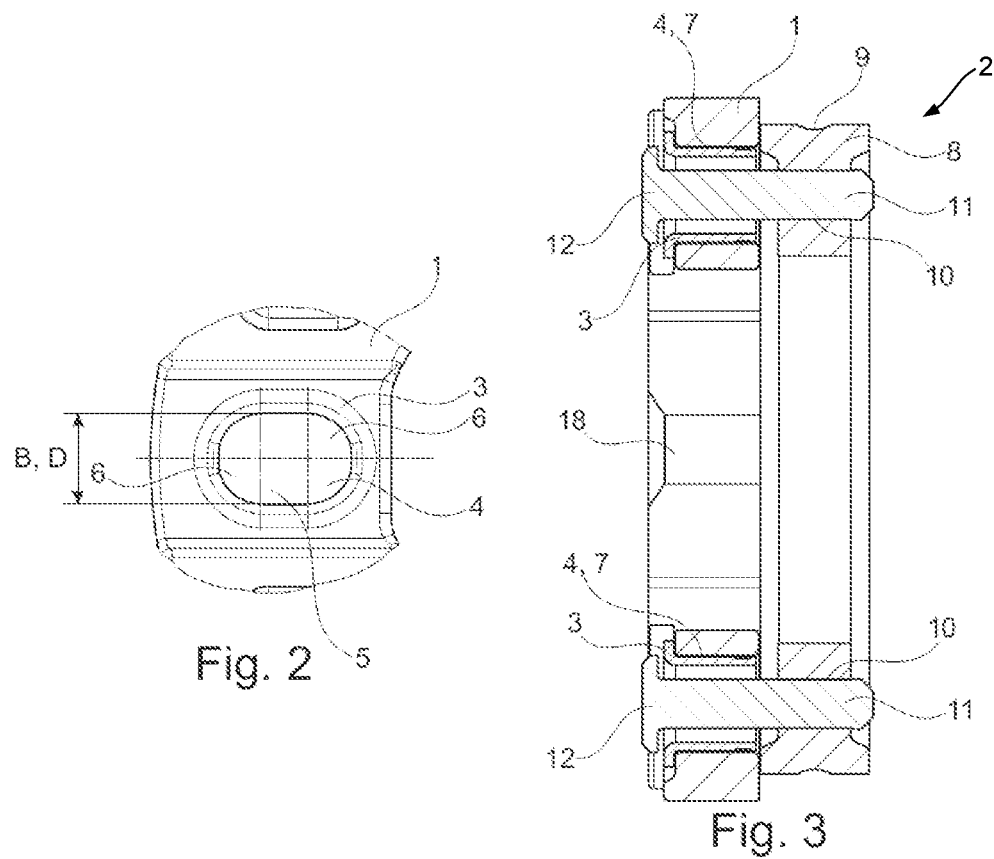
Fig. 2
Fig. 3

OLDHAM COUPLING

CROSS-REFERENCE TO RELATED APPLICATIONS

This application is the U.S. National Phase of PCT Appln. No. PCT/DE2016/200161 filed Mar. 24, 2016, which claims priority to DE 102015206411.5 filed Apr. 10, 2015, the entire disclosures of which are incorporated by reference herein.

TECHNICAL FIELD

The disclosure relates to an Oldham coupling, for example, for compensating an axial offset between two parallel shafts.

BACKGROUND

DE 10 2007 049 072 A1 discloses an Oldham coupling in which the central disk, also referred to as an Oldham disk, is composed of plastic. This may be advantageous for reasons connected with weight and for improving the mass moment of inertia.

In general, plastic has a low hardness, and therefore plastic generally wears more quickly than metal. The term "wear" is understood to mean a loss of mass from a surface of a material owing to scraping, rolling, impacting, chemical and thermal stresses and typically represents an unwanted change in the surface. Wear occurs in interaction between at least two components and is dependent on the material, shape and surface thereof.

SUMMARY

One object of the present disclosure is to develop an Oldham coupling in such a way that the wear on the central disk is minimized.

To achieve this object, several embodiments of the Oldham coupling are disclosed.

In principle, an Oldham coupling has two outer rotatable parts, which may be referred to as connecting disks. However, the rotatable parts can be embodied in any way and do not necessarily have to be designed as disks. The Oldham coupling comprises two outer connecting disks having axes of rotation extending parallel and a central connecting disk. One of the two outer connecting disks may be coupled to the central connecting disk by means of a plurality of connecting elements, such as bolts or pins, wherein each of the connecting elements is movably guided in the central connecting disk in a through-bore. The disclosed Oldham coupling may include a sleeve arranged in each of the through-bores as a wear insert. Accordingly, the inserted sleeve may counteract the wear of the central connecting disk. The through-bores may be designed as slotted holes. The term slotted hole may be used to denote an elongate bore, the narrow sides of which are closed by two identical semicircles, wherein the diameter of the semicircles corresponds to the width of the slotted hole, and the long sides of which extend parallel to one another.

The sleeve may have a through-slot. This may allow the sleeve to be produced from strip material.

The sleeve may have a spacer or a flange at one end. The spacer and the flange may be provided to ensure that, when a pin is used as a connecting element, the head of the pin does not rest directly on the central connecting disk and hence no wear can occur on the face of the central connecting disk. Moreover, the flange may form a stop, thereby making the assembly and exact positioning of the sleeve easier.

The sleeve may have a greater hardness than the material used for the central connecting disk. The sleeve may be composed of metal. The central connecting disk may be composed of plastic or of steel.

The sleeve may be pressed or fitted into the through-bore of the central connecting disk. However, it is quite possible for the sleeve to be secured by adhesive bonding in the central connecting disk. Thus, non-positive and/or positive connections between the central connecting disk and the sleeve are conceivable. Another possibility is to design the connection between the sleeve and the central connecting disk as a clearance fit, likewise giving rise to a secure connection by virtue of the different heat expansion coefficients.

BRIEF DESCRIPTION OF THE DRAWINGS

Further details, features, combinations of features and effects based on the disclosure will become apparent from the following description of preferred illustrative embodiments of the disclosure and from the drawings, in which:

FIG. 1 shows an embodiment of a central connecting disk of an Oldham coupling having two pressed-in sleeves in plan view, FIG. 2 shows a detail of FIG. 1, FIG. 3 shows an embodiment of a coupling of the central connecting disk to an outer connecting disk of the Oldham coupling in section.

DETAILED DESCRIPTION

Figure 4:
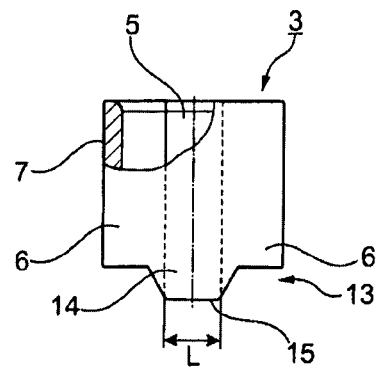
FIG. 4 shows an embodiment of a sleeve having a spacer in a partially sectioned view.

FIG. 1 shows an embodiment of a central connecting disk 1 of an Oldham coupling 2, which is also referred to as an Oldham disk, having two pressed-in sleeves 3. The Oldham coupling 2 may be used in an electric camshaft adjuster of an internal combustion engine, for example. The general construction and operation an Oldham coupling are described above.

The central connecting disk 1 of the Oldham coupling 2 has two slotted through-holes 4 and two recesses 18. The slotted holes 4 and the recesses 18 may be arranged alternately at an angle of 90° in each case in the circumferential direction. The recesses 18 may be provided for the purpose of receiving a first outer connecting disk 19 (see FIG. 14), which may also be referred to as a driving element. The term "slotted holes" 4 may be understood to mean elongate bores, having a rectangular shape 5 of which ends with semicircles 6 on two opposite sides. The diameter D of the semicircles 6 may correspond to the width B of the slotted hole 4. A sleeve 3 may be fitted into each slotted hole 4. The sleeves 3 may have a slotted-hole contour 7 that is the same or similar to the slotted hole 4. In FIG. 2, one of the two slotted holes 4 with the sleeve 3 fitted is shown as a detail of FIG. 1.

Figure 13:
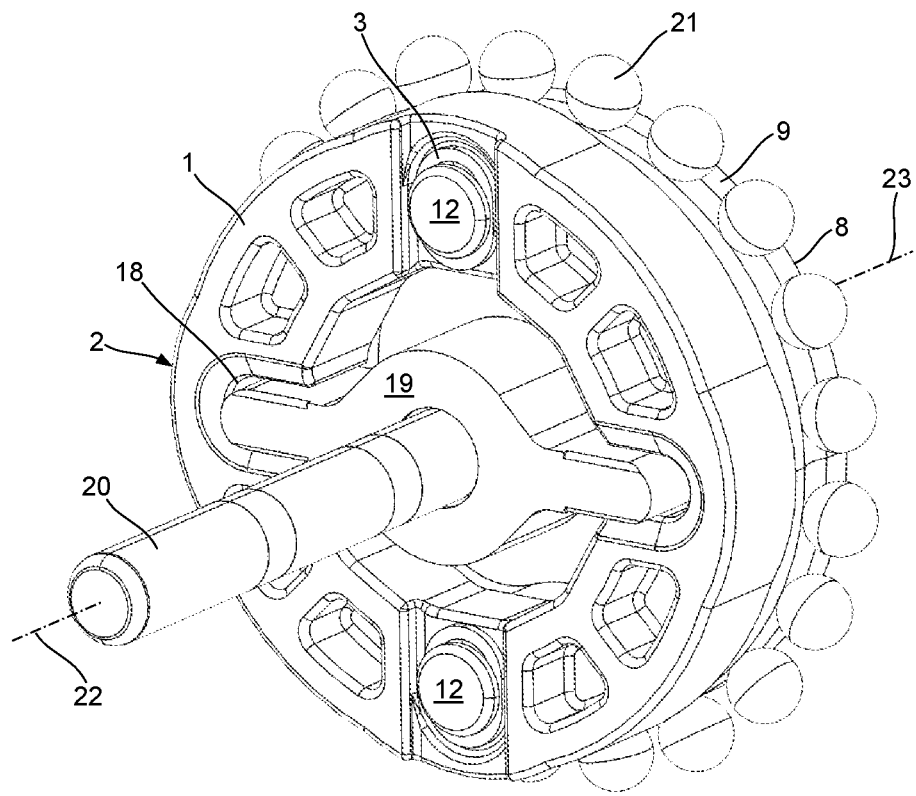
FIG. 13 shows an embodiment of the Oldham coupling in perspective view.

FIG. 3 shows an example of the coupling of the central connecting disk 1 to a second outer connecting disk 8 of the Oldham coupling 2. FIG. 13 shows the Oldham coupling 2 in perspective view, including the first outer connecting disk 19, a shaft 20 connected to the first outer connecting disk 19, a rotational axis 22 of the first outer connecting disk 19, and a rotation axis 23 of the second outer connecting disk 8. The second outer connecting disk 8 may be a bearing inner ring having a rolling element race 9 formed on the outside diameter. Rolling elements 21 which roll on the rolling element race 9, may be designed as balls as shown. The central connecting disk 1 and the second outer connecting disk 8 may be arranged so as to rest directly on one another, while being flush, and may be movable to a limited extent relative to one another. Each of the central connecting disk 1 and the second outer connecting disk 8 may have two radially opposite through-bores 10. The through-bores 10 in the central connecting disk 1 are designed as slotted holes 4, into each of which a sleeve 3 is pressed. The centerlines of the slotted holes 4 coincide with the centerlines of the through-bores 10 in the second outer connecting disk 8, with the result that the central connecting disk 1 may be coupled to the second outer connecting disk 8 by means of two pins 11. Each of the two pins 11 may have a pinhead 12, wherein both pinheads 12 protrude from the slotted holes 4 on the face remote from the second outer connecting disk 8. The pin 11 is pressed into the second outer connecting disk 8 and is guided in the sleeve 3 of the central connecting disk 1 in such a way as to be movable radially by virtue of the slotted-hole contour 7. The slotted holes 4 and the recesses 18 enable the first and second outer connecting disks 19, 8 to be moved perpendicularly to one another in linear fashion.

Figure 5:
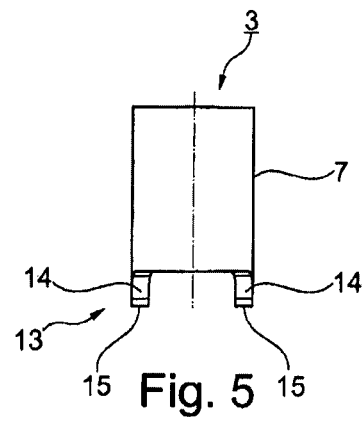
FIG. 5 shows the sleeve in FIG. 4 rotated through 90°.
Figure 6:
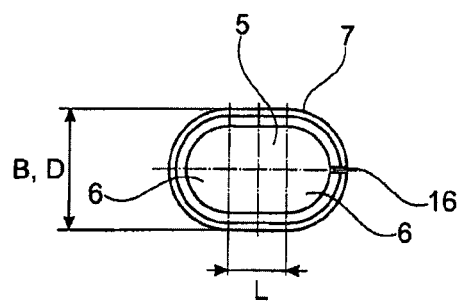
FIG. 6 shows the sleeve in FIG. 4 in plan view.

FIG. 4 to FIG. 12 show three embodiments of the sleeve 3. FIG. 4 to FIG. 6 show a first embodiment in various views. This sleeve 3 can have a spacer 13 on one end. The spacer 13 comprises two raised portions 14 arranged opposite one another in a circumferential direction, which extend axially in the same direction. The shape of the raised portion 14 forms a trapezoid, the short parallel side 15 of which corresponds to the length L of the rectangle 5 of the slotted-hole contour 7 of the sleeve 3. The pinhead 12 can thus rest on both raised portions 14, thereby avoiding direct contact with the central connecting disk 1 and resultant wear on the face of the central connecting disk 1 caused by the pinhead 12. Moreover, the sleeve 3 can have a straight through-slot 16.

Figure 7:
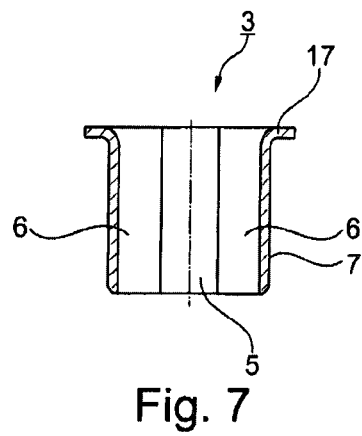
FIG. 7 shows another embodiment of a sleeve having a flange in section.
Figure 8:
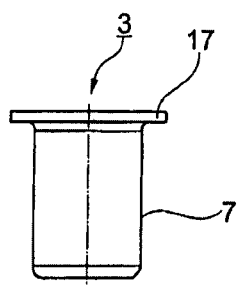
FIG. 8 shows the sleeve in FIG. 7 in side view.
Figure 9:
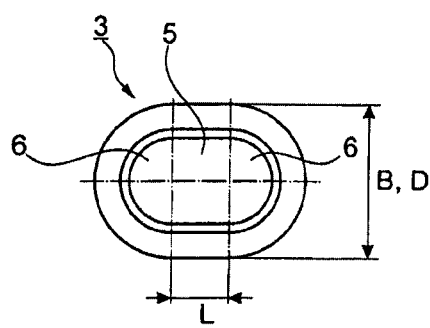
FIG. 9 shows the sleeve in FIG. 7 in plan view.

FIG. 7 to FIG. 9 show a second embodiment of a sleeve 3. This sleeve 3 has a flange 17 on one end. The flange 17 forms a stop for the exact positioning of the sleeve 3 in the slotted hole 4 as well as a protection against wear for the central connecting disk 1 relative to the pinhead 12. The pinhead 12 can thus rest directly on the flange 17 without the central connecting disk 1 being worn by the radial movement of the pin 11 (see FIG. 14).

Figure 10:
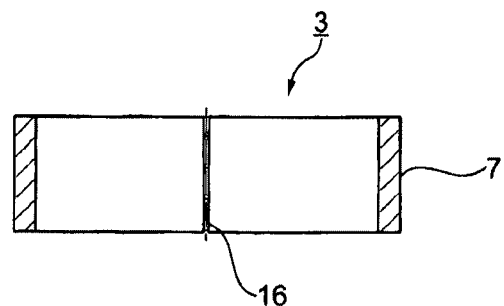
FIG. 10 shows another embodiment of a sleeve in section.
Figure 11:
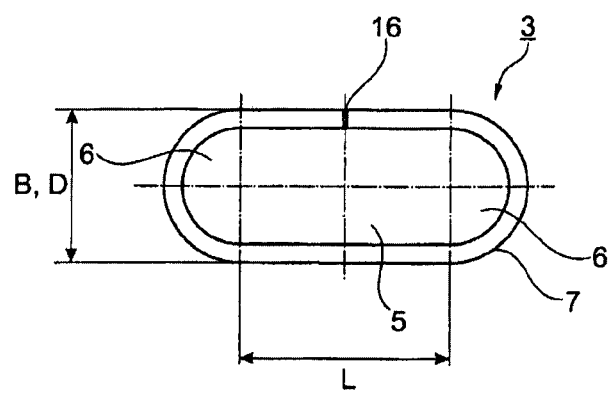
FIG. 11 shows the sleeve in FIG. 10 in plan view.
Figure 12:
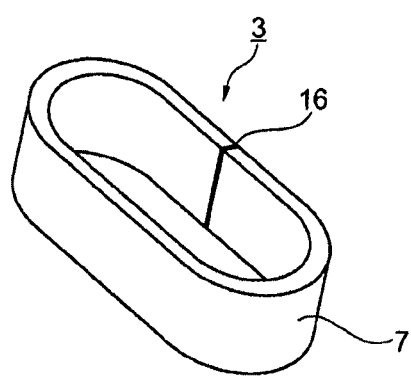
FIG. 12 shows the sleeve in FIG. 10 in perspective view.

FIG. 10 to FIG. 12 show a third embodiment of a sleeve 3. This represents the shape of a sleeve 3 which may be the simplest to manufacture. The sleeve has a slotted-hole contour 7 and a slot 16. The slot 16 may be arranged centrally on a side of the rectangular shape 5 which does not end with a semicircle 6. The slot is provided for reasons connected with manufacture and for tolerance compensation.

Figure 14:
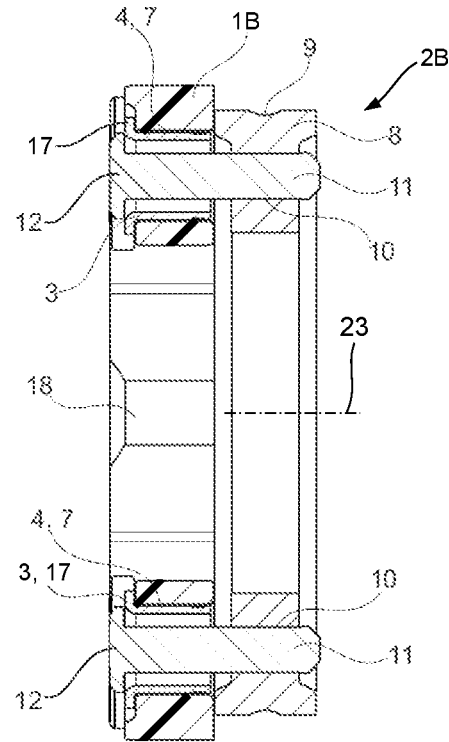
FIG. 14 shows an embodiment of a coupling of a plastic central connecting disk to an outer connecting disk of the Oldham coupling in section.

The sleeve 3 may have a greater hardness than the material used for the central connecting disk 1. The sleeve 3 may be composed of a metal, such as steel. FIG. 14 shows an example embodiment of a central connecting disk 1B composed of plastic; as shown in FIG. 3, the central connecting disk 1 may also be composed of a metal, such as steel.

LIST OF REFERENCE SIGNS 1 central connecting disk
1B central connecting disk
2 Oldham coupling
2B Oldham coupling
3 sleeve
4 slotted hole
5 rectangle
6 semicircle
7 slotted-hole contour
8 second outer connecting disk
9 rolling element race
10 through-bore
11 pin
12 pinhead
13 spacer
14 raised portion
15 short parallel side of the trapezoidal raised portion
16 slot
17 flange
18 recess
19 first outer connecting disk
20 shaft
21 rolling element, ball
22 rotational axis of first outer connecting disk
23 rotational axis of second outer connecting disk
D diameter of the semicircle
B width of the slotted hole
L length of the rectangle of the slotted-hole contour

The invention claimed is:

1. An Oldham coupling, comprising:
two outer connecting disks having axes of rotation extending parallel to each other and a central connecting disk;
one of the two outer connecting disks being coupled to the central connecting disk by a plurality of connecting elements;
each of the connecting elements being movably guided in the central connecting disk in a through-bore; and
a sleeve having a slotted hole contour, the sleeve arranged in each of the through-bores as a wear insert, and each of the connecting elements arranged to be movable radially within the slotted hole contour.

2. The Oldham coupling as claimed in claim 1, wherein the sleeve has a through-slot.

3. The Oldham coupling as claimed in claim 1, wherein the sleeve has a spacer at one end.

4. The Oldham coupling as claimed in claim 3, wherein the spacer includes two raised portions arranged opposite one another, the raised portions configured to contact a head of one of the connecting elements.

5. The Oldham coupling as claimed in claim 4, wherein the raised portions are shaped as trapezoids.

6. The Oldham coupling as claimed in claim 1, wherein the sleeve has a flange at one end.

7. The Oldham coupling as claimed in claim 1, wherein the sleeve is composed of metal.

8. The Oldham coupling as claimed in claim 1, wherein the sleeve is pressed or fitted into the through-bore of the central connecting disk.

9. The Oldham coupling as claimed in claim 1, wherein the central connecting disk is composed of plastic.

10. The Oldham coupling as claimed in claim 1, wherein the central connecting disk is composed of steel.

11. The Oldham coupling as claimed in claim 1, wherein each of the through-bores is formed as an elongate hole.

12. The Oldham coupling as claimed in claim 1, wherein an outside diameter of the one of the outer connecting disks forms a rolling element race.

13. The Oldham coupling as claimed in claim 1, wherein each sleeve has a contour that matches a contour of the through-bore.

14. An Oldham coupling, comprising:
 a first outer connecting disk and a second outer connecting disk having axes of rotation extending parallel to each other;
 a central connecting disk including a through-bore;
 a connecting element coupling the first outer connecting disk to the central connecting disk via the through-bore; and
 a sleeve having a slotted hole contour, the sleeve arranged in the through-bore such that the connecting element contacts the sleeve and is spaced from an end face of the central connecting disk.

15. The Oldham coupling of claim 14, wherein the through-bore comprises a plurality of through-bores in the central connecting disk; the connecting element comprises a plurality of connecting elements that couple the first outer connecting disk to the central connecting disk via the plurality of through-bores; and the sleeve is arranged in each through-bore.

16. The Oldham coupling of claim 14, wherein the sleeve has a spacer at one end.

17. The Oldham coupling of claim 16, wherein the spacer includes two raised portions arranged opposite one another, the raised portions configured to contact a head of the connecting element.

18. The Oldham coupling of claim 14, wherein the sleeve has a flange at one end.

19. The Oldham coupling of claim 14, wherein the sleeve is composed of metal.

20. The Oldham coupling as claimed in claim 14, wherein the sleeve has a contour that matches a contour of the through-bore.

* * * * *